(12) United States Patent
Godfrey (10) Patent No.: US 7,610,739 B2
(45) Date of Patent: Nov. 3, 2009

(54) RIDING MOWER

(75) Inventor: Vern Godfrey, Warrensburg, MO (US)

(73) Assignee: BeeLine Mowers and Equipment, LLC, Warrensburg, MO (US)

( * ) Notice: Subject to any disclaimer, the term of this patent is extended or adjusted under 35 U.S.C. 154(b) by 0 days.

(21) Appl. No.: 12/186,296

(22) Filed: Aug. 5, 2008

(65) Prior Publication Data

US 2009/0100817 A1    Apr. 23, 2009

Related U.S. Application Data (60) Provisional application No. 60/999,515, filed on Oct. 18, 2007, provisional application No. 61/005,835, filed on Dec. 7, 2007.

(51) Int. Cl.
    *A01D 34/00* (2006.01)
(52) U.S. Cl. .................................. 56/15.6; 56/16.7
(58) Field of Classification Search ............... 56/16.7, 56/17.2, 15.7, 15.8, DIG. 14, DIG. 22, 15.6; 280/48.13, 287, 481, 481.3
    See application file for complete search history.

(56) References Cited

U.S. PATENT DOCUMENTS

| | | | |
|---|---|---|---|
| 5,475,971 A * | 12/1995 | Good et al. .................. 56/14.9 |
| 6,341,480 B1 * | 1/2002 | Dahl et al. .................... 56/15.9 |
| 6,434,919 B2 * | 8/2002 | Schick ........................ 56/15.9 |
| 6,631,608 B1 * | 10/2003 | Eykelkamp ................. 56/15.6 |
| 6,675,567 B2 * | 1/2004 | Samejima et al. ............ 56/16.7 |
| 6,988,351 B2 | 1/2006 | Schick et al. |
| 7,028,456 B2 * | 4/2006 | Thatcher et al. .............. 56/15.6 |

\* cited by examiner

*Primary Examiner*—Robert E Pezzuto
(74) *Attorney, Agent, or Firm*—Lathrop & Gage LLP (57) ABSTRACT

A mid-mount riding rotary mower which has a two-piece frame. The frame includes a front section that is pivotally connected to a rear section. The mower deck is carried beneath the mower between the front and rear wheels. The mower deck is attached to the front frame and follows the movement of the front wheels. The front frame includes swing arms that carry the front wheels from a first position in front of the mower to a side position for deck maintenance. In the maintenance position the deck can be removed from under the mower easily by rolling the deck forward. Either detachment of the deck or telescoping arms enable the deck to be moved out from under the mower. The deck can then be tilted up to a stable vertical orientation for maintenance of the blades.

22 Claims, 11 Drawing Sheets

RIDING MOWER

RELATED APPLICATIONS

This application claims the priority of U.S. Provisional Application No. 60/999,515 filed Oct. 18, 2007 and U.S. Provisional Application No. 61/005,835 filed Dec. 7, 2007, the disclosures of each being incorporated herein by reference.

FIELD OF THE INVENTION

The disclosures herein relate generally to the field of self-propelled lawn mowers. More specifically, these disclosures relate to the field of riding mower frame construction, suspension systems, and maintenance accessibility.

BACKGROUND OF THE INVENTION

The most common riding mowers have been the tractor type which either pull a mower deck or have a deck under the belly of the mower. The great shortcoming of the tractor-type mower is its lack of maneuverability. Zero-turning-radius mowers have been developed that steer through variable forward and reverse traction which is applied to the rear driving wheels. This improved maneuverability.

Traction steering mowers generally fall into two types, either a front deck mount or a mid-deck mount. Each type has its own advantages and related problems. One of the mid-mount mowers' advantages is in its compact footprint (size). Its greatest shortcoming is the difficulty of accessing the mower deck for service and maintenance, such as cleaning dirt and debris or sharpening and/or changing blades. More specifically, an operator or service technician must raise the front end of the mower vehicle off the ground, utilizing jacks or ramps to a height sufficient for a person to crawl under the mower deck for maintenance. Some of the dangers of the above include the risk of the vehicle falling on the servicing person, getting dirt or debris in that person's eyes, and the difficulty of checking for bent blades and blade tracking while in this position. Because of these difficulties, many mid-mount mower decks do not receive thorough or timely maintenance.

Several prior art patents (see U.S. Pat. No. 6,988,351) have addressed the problems associated with deck maintenance on mid-mount mowers. In one embodiment the mower deck is unlatched at the rear and the front of the mower vehicle is raised manually allowing the deck to hinge forward from the rear. In this method, the mowers front castor wheels hang over the exposed underneath side of the mower deck blocking some of the accessibility. In other embodiments of the prior art (see U.S. Pat. No. 5,475,971) hydraulic cylinders or electric screw actuators are used to power hinge the deck forward for access. The shortcomings of all these concepts include that they must be designed into the mower and cannot be retrofitted into existing mower designs and the cost of the hydraulics and/or electric components. These costs limit their use to high-end commercial mowers and exclude their use on residential class mowers.

Existing prior art mid-mount mowers use one of two basic frame and front axle designs. One type has a rigid frame with the front castor wheels solidly attached. The other type has front castor wheels mounted to an axle that pivots on the front of the rigid frame. The rigid frame design works well on smooth ground, but rides rough on uneven ground. While mowing a slope, if the ground is rough, it is common for the up-hill front wheel to lose contact with the ground. The pivoting-axle mid-mount mower has improved some of these shortcomings but it has problems of its own. Mid-mount mowers carry the deck from flexible links fastened to the mower frame. When the front wheels encounter dips or rises on the ground surface, this cannot be translated to the mower deck because the front castor wheels are attached to an axle that is pivoting on the center of the front of the mower frame. The mowing deck follows mostly the dictates of the rear wheels that haven't as yet reached these ground conditions. This causes the mower deck to dip and cut unevenly.

The product of this is usually an uneven cut or at worst ground scalping. Because of the advantages and the associated problems of the pivoting front axle, many pivoting-axle mowers have a locking pin to convert them back to a solid frame for certain mowing conditions.

SUMMARY OF THE INVENTION

The disclosed embodiments include a self-propelled lawn mower. The mower has a front frame with a pair of front wheels mounted about a castor axis and a rear frame carrying the rear drive wheels. The front frame, in embodiments, is pivotally mounted on the rear frame. A mowing deck, in embodiments, is supported under the front frame. Further, in embodiments, the front frame includes a pair of swing arms each carrying a front wheel and wherein each of said swing arms include a first position with said front wheel in front of the mower and a second position with the wheel beside the mower. Additionally, in embodiments, telescoping mower deck push arms are used to make the blade deck removable from underneath the mower.

These and other advantages of the disclosed embodiments will become apparent from the detailed description of the invention.

DETAILED DESCRIPTION OF THE DEVICE

Figure 1:
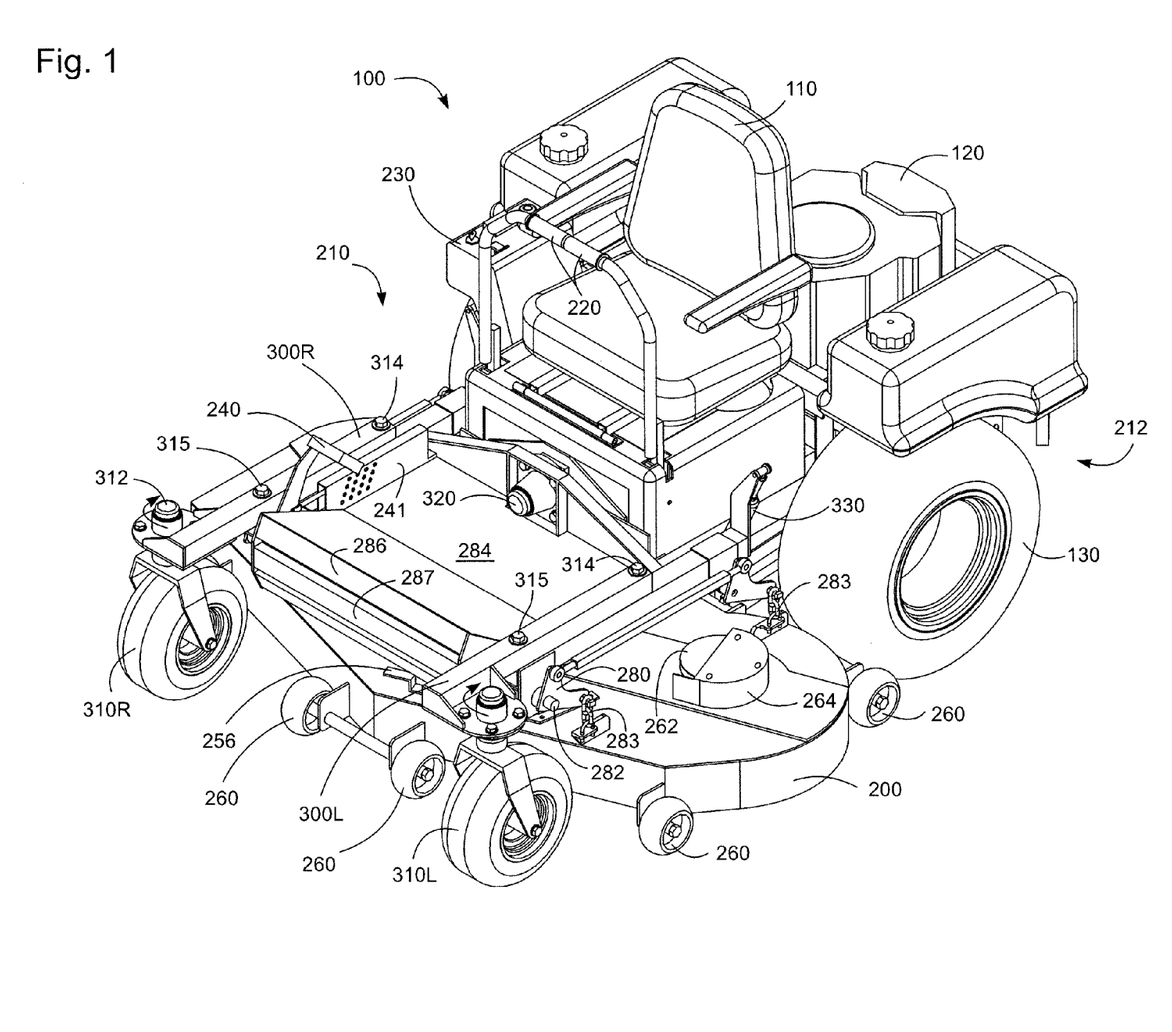
FIG. 1 shows a perspective view of the mower.

FIG. 1 shows a view of the mower 100. The mower 100 includes an operator seat 110, an engine 120, and a rear set of drive wheels 130. Mower 100 also includes a mower deck 200 mounted beneath a forward frame 210 portion of the mower 100. Forward frame 210 is mounted to the rear frame 212. From the operator's seat the operator can reach steering bars 220, which control right and left hydrostatic pumps (not shown in detail), that control the motion of the rear wheels 130. The operator can also reach a control panel 230 and a foot-operated deck height adjustment pedal 240.

Mower deck 200 includes gauge wheels 260 and deck drive pulleys 262. The gauge wheels 260 carry the mower deck 200 to prevent the blades from scalping the ground only when the mower wheels 310 and 130 encounter extreme roughness in the terrain. The pulleys 262 drive individual mower blades from a belt driven by engine 120 in a manner known to those skilled in the art. Mower deck 200 also includes pivotal deck height adjustment arms 280. Adjustment arms 280 are fixed to and rotate with a shaft 282. Shaft 282 is rotated using a pedal 240 which is fixed to one end of shaft 282 to allow an operator to adjust the deck 200 mowing height using the foot pedal 240. To lessen the effort required to raise the deck by the foot pedal, an adjustable torsion spring 288 (FIG. 5) is positioned to apply tension in the lift direction to shaft 282. By depressing the pedal to raise the mower deck and inserting a pin in one of a series of fore and aft holes 241 (FIG. 2), the deck is set to a predetermined height above the ground. In one embodiment, each successive hole (not shown in detail), going forward, raises the deck ¼" from a low of 1" to a high of 5". The pin holds a sliding yoke that is inside the tube containing the series of holes. The yoke has a wide slot, which allows it to slide forward over the height adjustment pin. The sliding yoke further has a bar (not shown), hinge mounted to its aft end, which has a forward and a rearward notch. When the foot pedal is depressed to its extreme forward position, the rearward notch latches, holding the deck in its predetermined upper position (e.g., 5 inches) above the ground surface. The sliding bar further has a trip lever (not shown), which can be reached, from the driver's seat. By depressing the foot pedal and raising up on the trip lever, the deck can be returned to its preset height resting on the pin. When the deck is lowered to the ground and resting on its gauge wheels, the pedal can be pushed further to the rear, the sliding bar will engage in the fore mentioned forward notch releasing the spring tension on the lifting arms. This allows the deck carrying chains to be removed from the lifting arms. The mower deck assembly 200 is covered by a foot platform 284.

The forward frame 210 includes swing arms 300, which are pivotally mounted to the frame 210. The swing arms 300 each include a front wheel 310 which is mounted about a castor axis 312 at a forward end, and a pivot mount 314 at the other end. Each pivot mount comprises a bolt 314 which is received in the frame beneath. Thus, the arms are able to be outwardly and horizontally pivoted about bolts 314 from a first in-operation position shown in FIG. 1 to a second deck servicing position shown in FIG. 2. When in the first in-operation position, the arms are normally retained in place by a locking bolt 315. The locking bolts 315 are each received through a hole (319) bored through each of arms 300 and into threaded holes 317 in the front frame (see FIG. 2).

The forward frame 210 includes a pivot mounting 320 that pivotally mounts the front frame 210 to the rear frame 212. The axis of pivot mounting 320 is substantially parallel to the longitudinal axis of the mower. Thus, the movement allowed is in a plane that is normal thereto. The erratic movements of the front frame 210 in response to rough terrain is controlled in part by shock absorber devices 330 (FIG. 5) which are substantially tangentially mounted at lateral positions to pivot 320 between a rearward portion of front frame 210 and a forward position of the rear frame 212. Thus, the dynamic rocking of the front frame is controlled so that the ride of the mower is shock-dampened, and the cutters are maintained at a preset distance and parallel to the ground as the mower is in operation.

FIG. 1 shows that the deck 200 is equipped with a plurality of gauge wheels 260 which normally are carried above the ground surface and only engage the ground when the mowers large front wheels 310 encounter extremely rough or uneven conditions. When the gauge wheels contact the ground they carry the cutter blades at a preset distance above the ground. Eight gauge wheels exist in this embodiment. The larger front wheels 310 follow the terrain, and provide stability. If the right front wheel 310 R encounters a rise in the ground level relative to the left front wheel 310 L, the right front wheel 310 R will tend to lift causing the deck 200 right side to pivot upward about pivot 320 and against the action of the shocks 330. As this occurs the rear frame 212 is unaffected. This allows the mower deck 200 to more closely follow the contours of the ground to be mowed without undue reliance on the gauge wheels and without an excessively rough ride for the operator.

Figure 2:
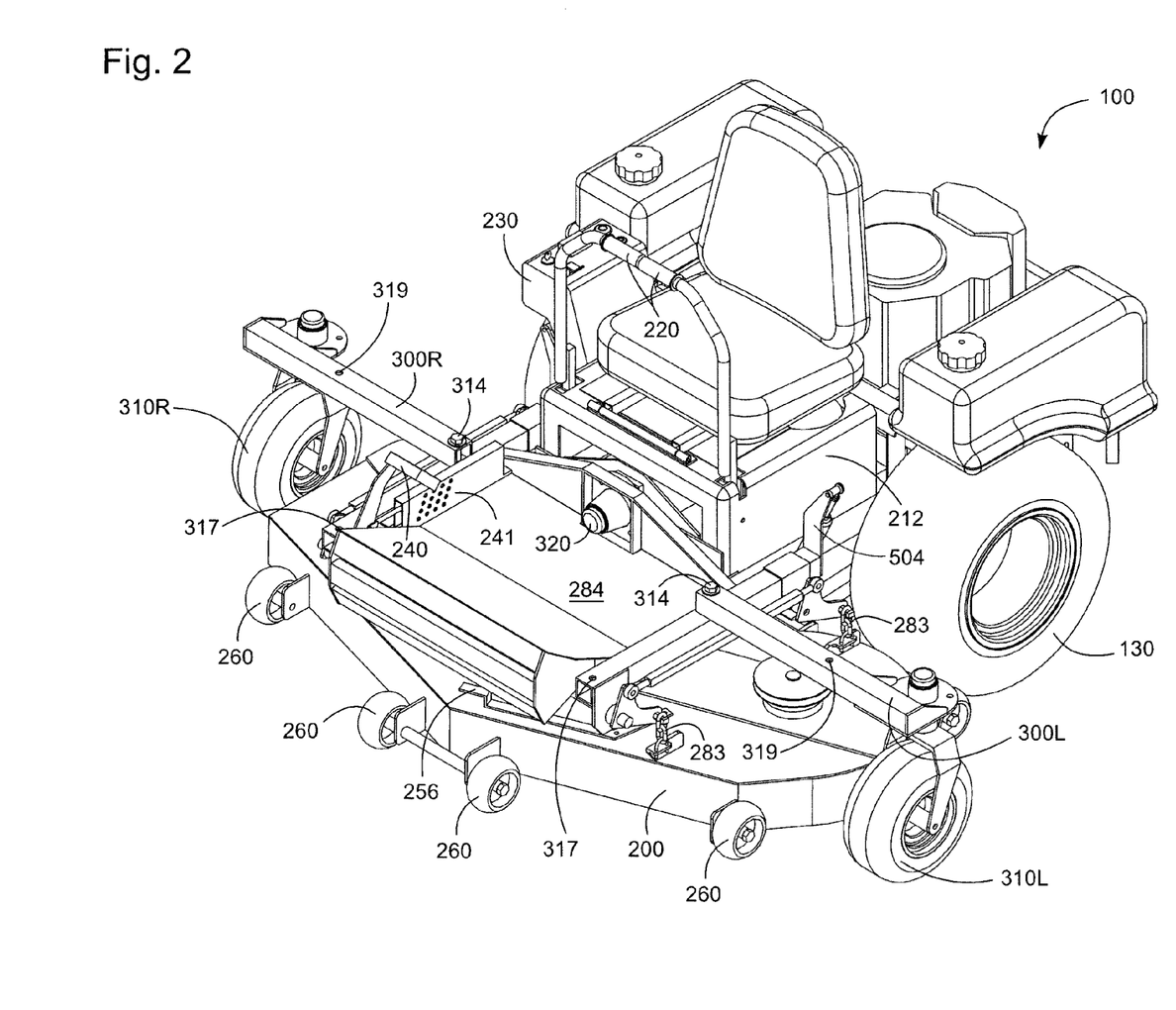
FIG. 2 shows a view with the front wheels pivoted to a service position.

FIG. 2 shows how swing arms 300L and 300R can be pivoted out to a position beside the mower 100 for servicing the blades or to access deck 200. To enable movement, arms 300L and 300R are unlocked by removing the bolts 315 from each of the respective receiving holes 317 (see FIG. 2) and out of the bores 319. When bolts 315 (see FIG. 1) are removed, arms 300L and 300R can be manually rotated about pivot bolts 314. Pivoting the arms 300 moves the wheels 310R and 310L out of the way of the mower deck 200. The four mower deck hanger chains 283 can be unhooked and the push arm pins 405R and 405L (FIG. 9) removed from rear frame clevis mount 1404 releasing the push arms 400. The belt 420 (FIG. 8) can then be removed and the mower deck 200 can be rolled forward by pulling it toward the front of the mower 100. There are two identical push arms 400 that are laterally displaced from one another and connect separately to each of a pair of clevis mounts 404 each laterally spaced apart on the underside of the rear frame (1404L and 1404R shown in FIG. 9). When being pulled from under the mower 100, the deck 200 will roll out from underneath the mower on gauge wheels 260.

Figure 3:
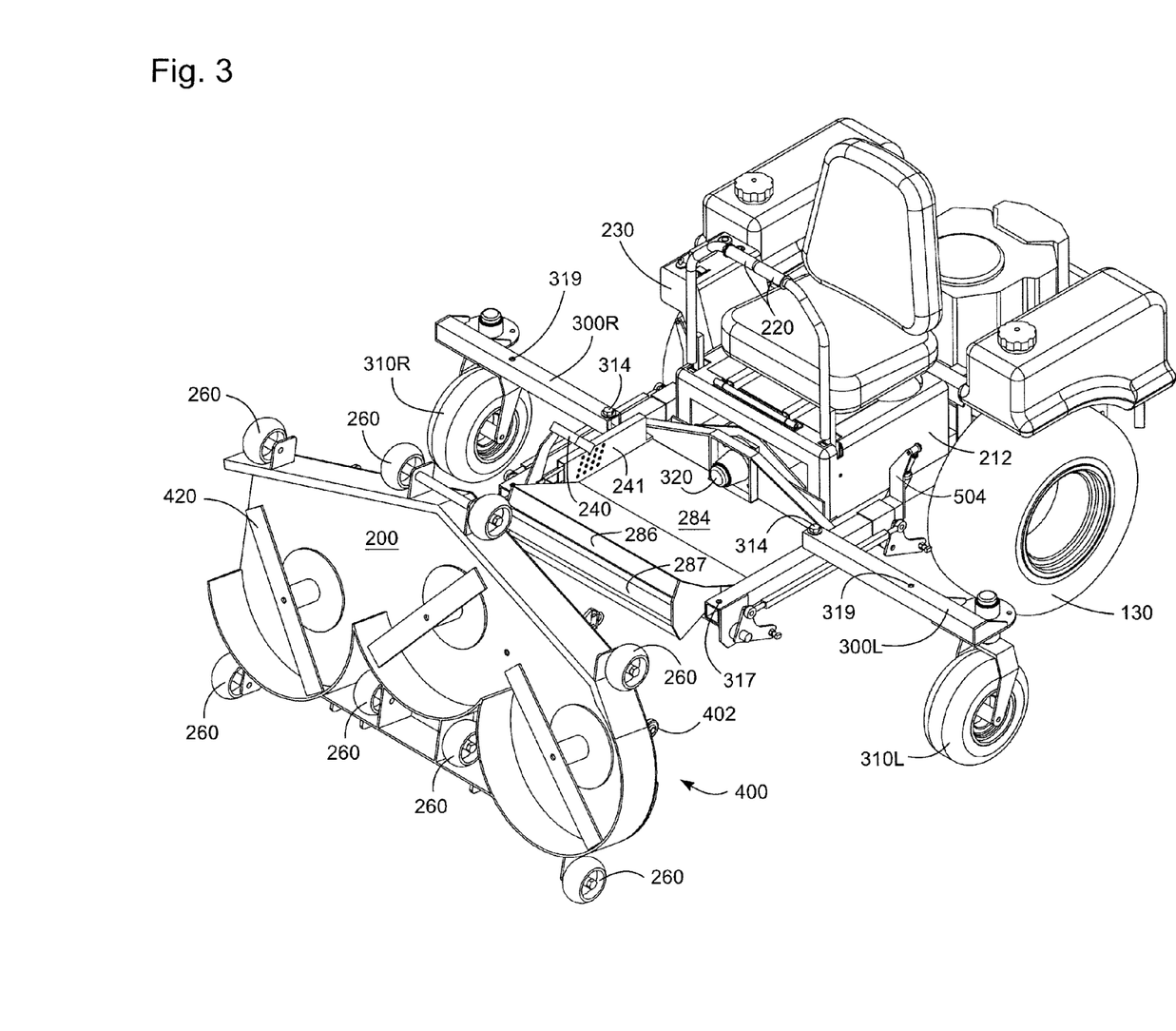
FIG. 3 shows the mower deck removed and tilted for service in a first disclosed embodiment.
Figure 4:
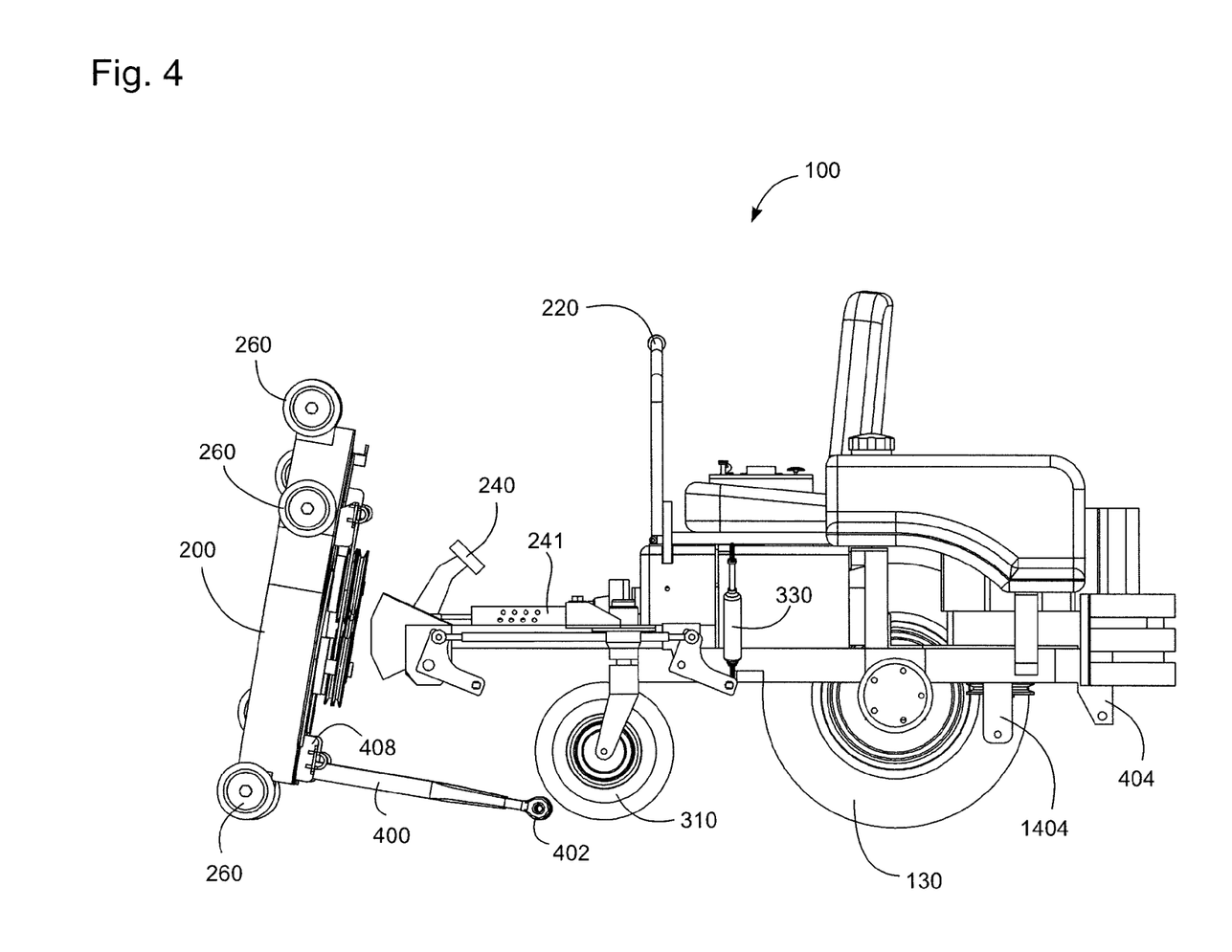
FIG. 4 shows a partial cutaway side view of first disclosed embodiment in which the deck is removed and then tilted up for service.
Figure 9:
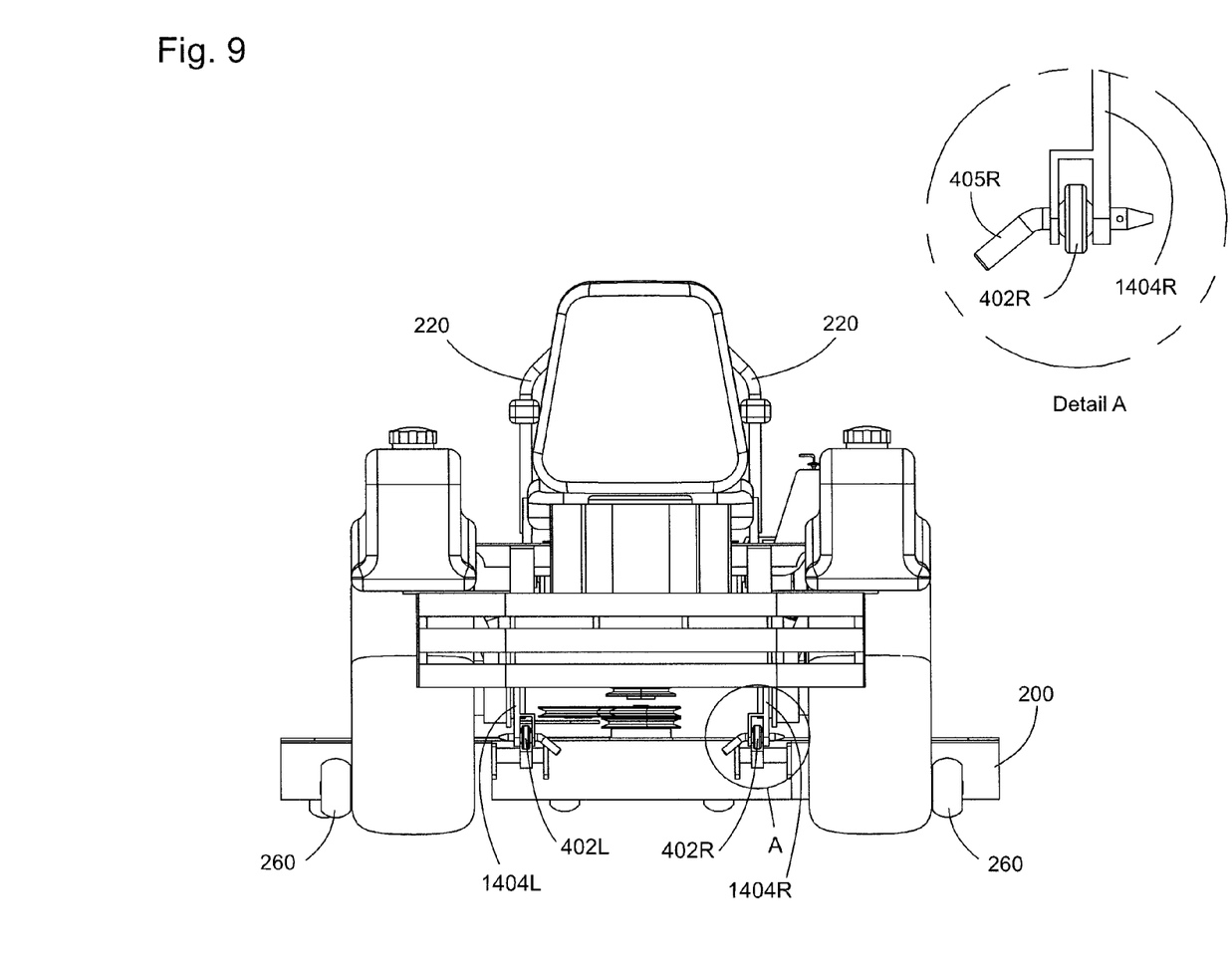
FIG. 9 shows a rear view of the first embodiment of the mower depicting deck push arm mounts and blade drive pulleys.
Figure 10:
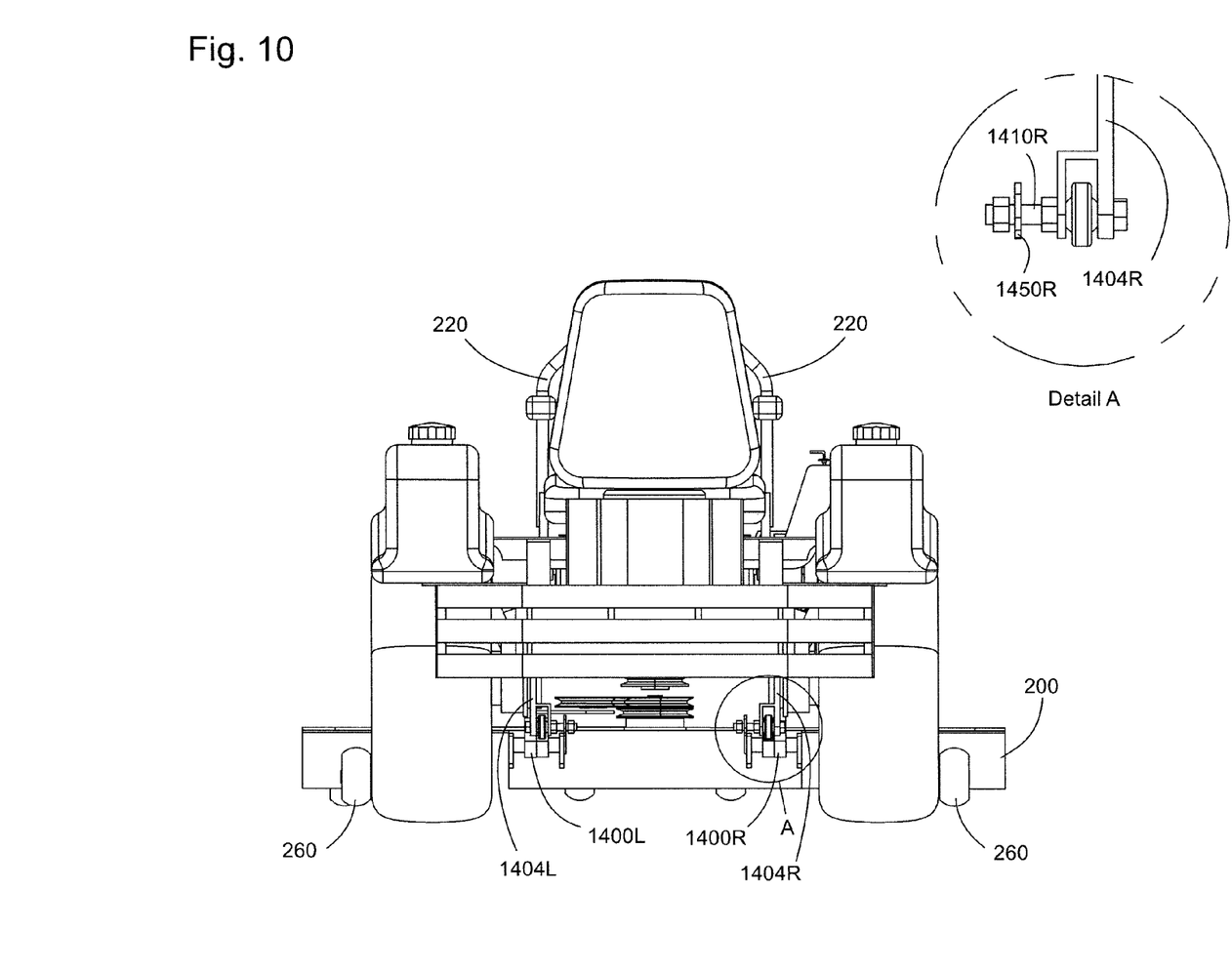
FIG. 10 shows a rear view of the second embodiment of the mower depicting telescoping deck push arm mounts and latch bar.

FIG. 4 shows the mower deck 200 in the first embodiment pulled out from under the mower 100 and tilted into its stable upright position for servicing. As can be seen in FIG. 4, the deck 200, when in the upright position, rests on the two gauge wheels 260 and on the link arm 400. The link arm 400 includes a swivel ball 402 that is normally connected to rear frame mount 1404 by connector pin 405 (FIG. 9). As can be seen in FIG. 3, in this position the blades 420 can easily be removed, sharpened or replaced.

Figure 8:
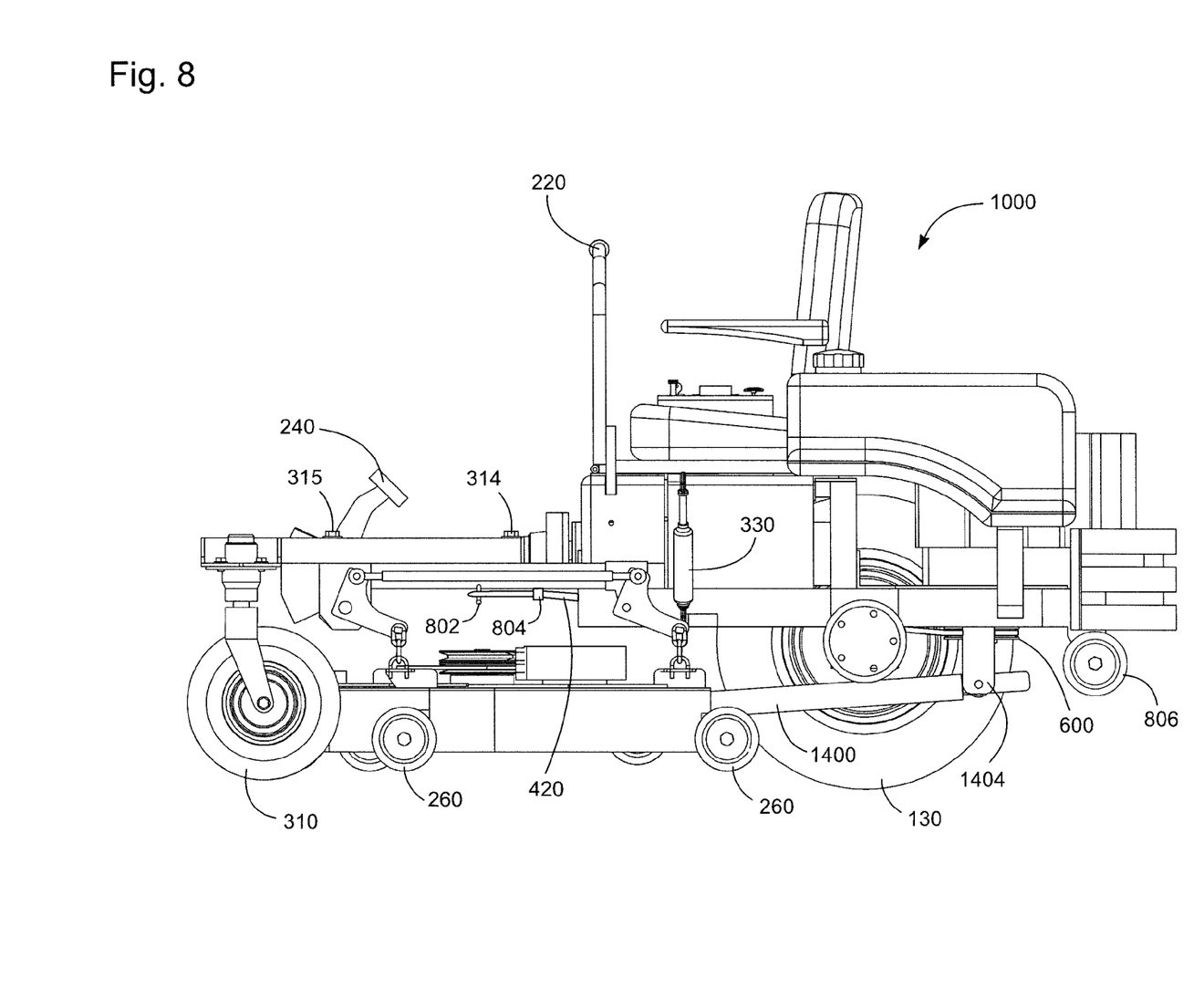
FIG. 8 shows a second side view of the second embodiment in which the deck is in retracted mowing position underneath the mower.

FIG. 4 shows a side view of the mower 100 with the deck 200 in the stable vertical maintenance position. The link arm 400 is free to pivot until it comes against the rest stop 408 fixed to the deck 200, then the link arm 400 holds the deck 200 in the maintenance position which is just past vertical such that the weight of the deck 200 rests against the arm 400. In this position an operator can sharpen the blades or in other ways service the deck. FIG. 8 shows the belt 420 and that the belt 420 is retained in position on the engine pulley 600 by keepers 802 and 804 when it is removed from the pulleys 262 on the deck 200.

To remove the mower deck 200 the steps include: The deck is placed in its lowest position such that the gauge wheels 260 are on the ground surface as shown in FIG. 1. Push pedal 240 is then moved backward to engage in an indent releasing tension of torsion spring 288 (FIG. 5) on chains 283 (FIG. 1). The chains 283 are then removed. Next, the floor plate 284 is removed by raising up on bar 285 and pulling forward (FIG. 1). An onboard wrench (not shown) which fits bolts 315 on the left and right hand sides, and the mower blade retaining bolts is retrievable from inside the front bumper 287 (FIG. 1). When the bolts 315 are both removed, the front wheels 310 can be moved to the position shown in FIG. 2. The left belt pulley guard 264 is removed and belt 420 (FIG. 8) is slacked by releasing the belt idler lever 256 (FIG. 2). Belt 420 is removed from the left and center pulleys 262 and placed in keepers 802 and 804 (FIG. 8), but left engaged in engine pulley 600. The deck 200 can then be pulled forward and tilted up to the position shown in FIG. 3.

It should be recognized that, although the deck is shown herein as being suspended underneath the front frame when in normal operation, in other embodiments it is possible that it might be suspended underneath the rear frame. In either case, the freedom provided by the pivot between the frames would benefit the leveling of the deck.

Figure 5:
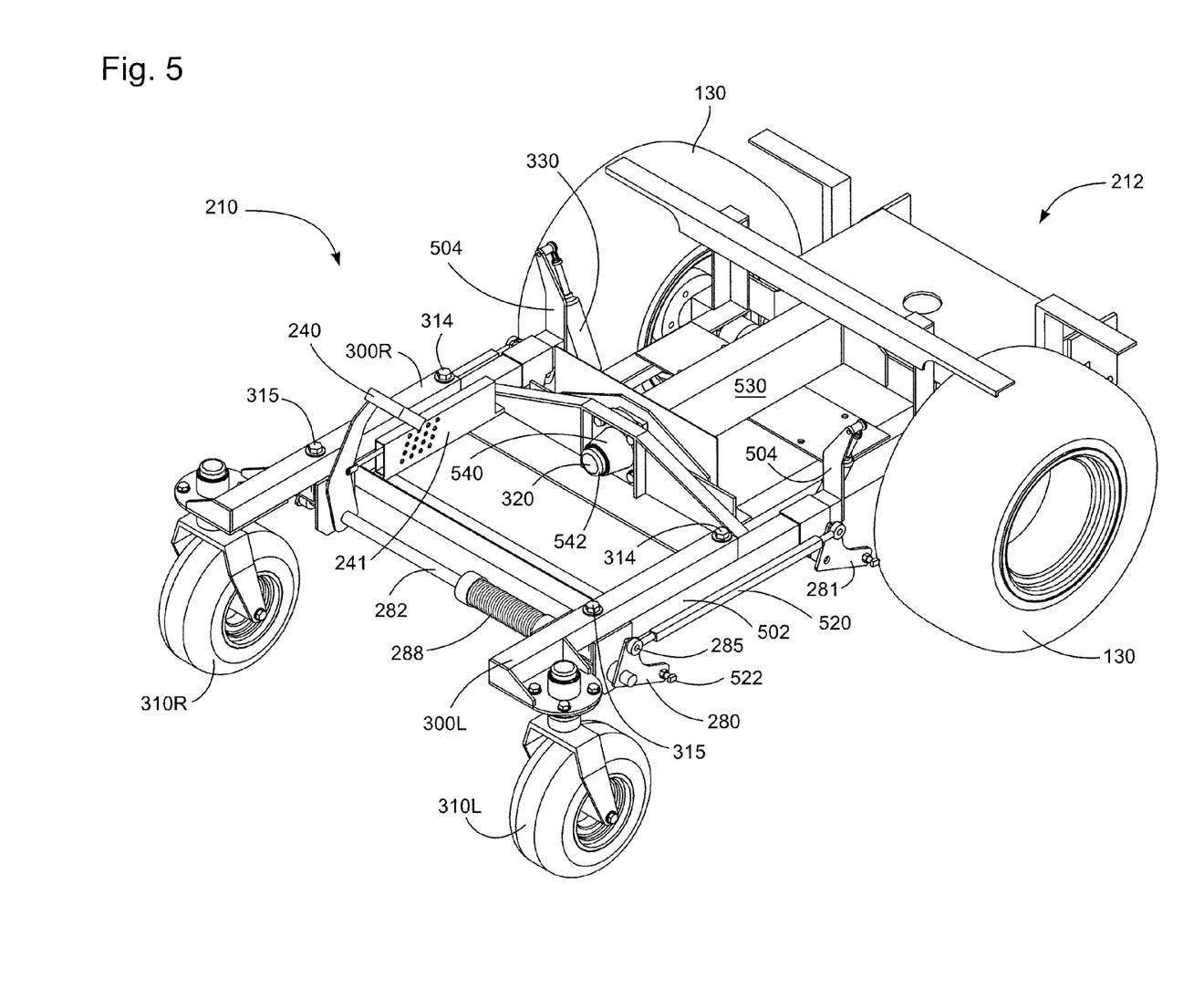
FIG. 5 shows details of the front and rear frame in which other mower components have been removed.

FIG. 5 shows a view of the mower 100 partially disassembled to show certain details. Specifically, FIG. 5 shows just the front 210 and rear frame 212 portions. The front frame 210 includes side frame rails 502 that are attached to weldments 504 to which the top end of shocks 330 are attached. It can be seen that pedal 240 is attached to a control bar 282. The pedal rotates the laterally-extending control bar 282 which acts on two forward mower deck height adjustment arms 280 which are fixed at each end of the control bar. Each of the two forward adjustment arms 280 include a relatively shorter outwardly extending portion 285 to which one of a pair of lateral linking members 520 are connected. The linking members 520 cause a rearward set of similar adjustment arms 281 (which also have short extended portions) to rotate in reciprocation with forward set 280. Attachment points 522 on relatively longer outwardly-extending portions on each of arms 280 and 281 are used to create lifting leverage to raise four chains 283 and thus the deck 200 when the pedal is depressed. In the disclosed embodiment the attachment means for chains 283 comprises a bolt with oblong head which protrudes out from the outwardly extending portions 522. The chains are easily disconnected if pivoted 90 degrees and lifted up and off of the bolt heads. The hanging chains are used as means to suspend and support the deck from the front frame.

The front frame portion 210 is pivotally mounted to the rear frame 212 by pivot 320. The pivot 320, which is adapted to rotate about its longitudinal axis, can include a hub 540 and an axle 542 in a longitudinal box housing 530. Box housing 530 is also the hydraulic reservoir. The shocks 330 will tend to resist against the motion of the front frame 210 relative to the rear frame 212 and will tend to restore the frames 210 and 212 to the neutral position shown in FIG. 5, thus providing independent movement of the front frame 210 relative to the rear frame 212. This arrangement allows the front frame 210 to smoothly follow the contour of the land.

Figure 6:
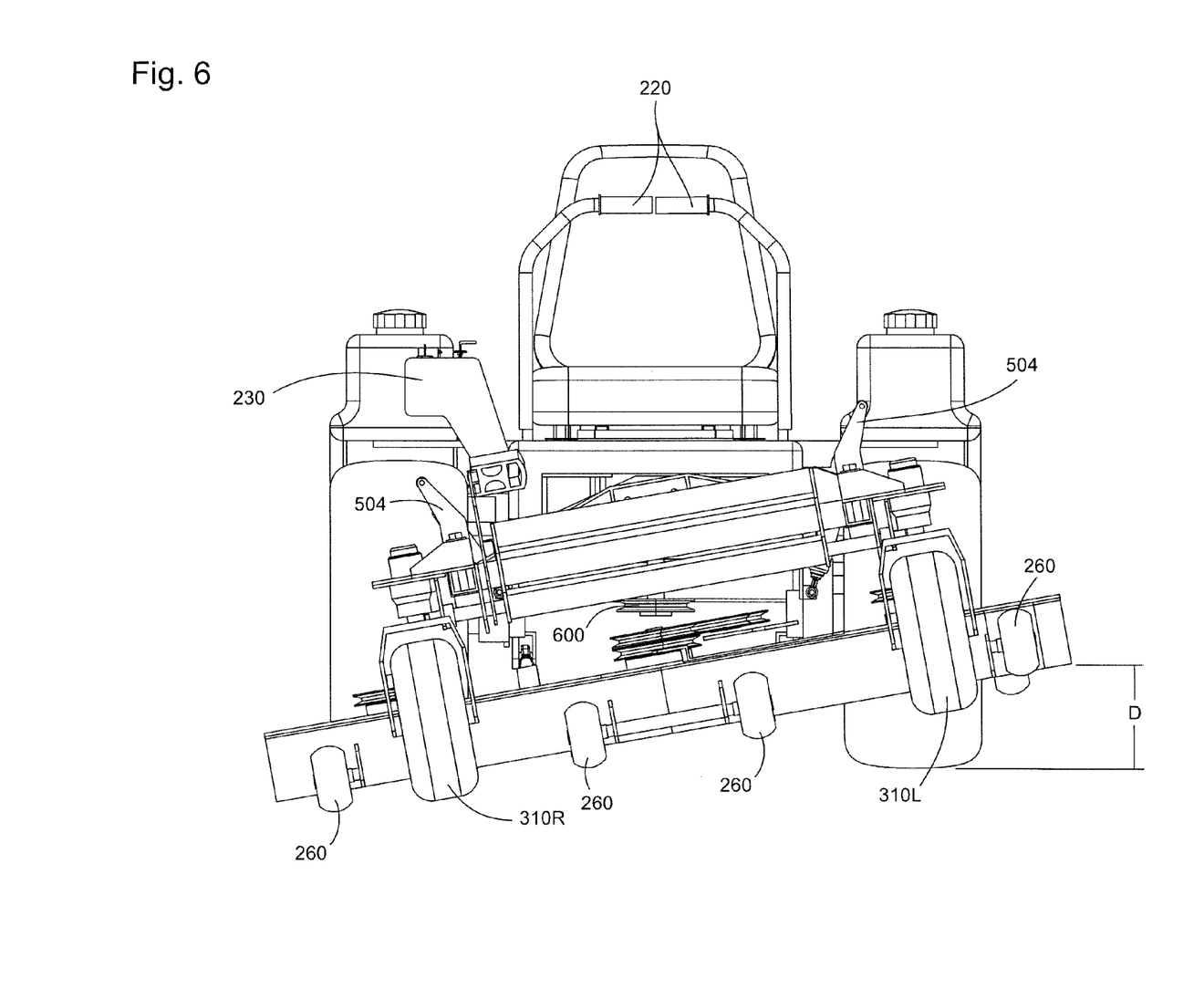
FIG. 6 shows a front view emphasizing the lateral pivotability of the front frame created by the longitudinal pivot mount provided.

FIG. 6 shows details of how the front frame 210 and deck 200 can tilt relative to the rear frame 212. The deck 200 can tilt a distance D above its neutral position as shown. The maximum distance D is limited by travel of the shocks 330 and interferences but is generally in the range of 3-6 inches as the maximum travel from a neutral position shown in FIG. 1 to a maximum tilt position as shown in FIG. 6. This tilt provides a smoother ride and keeps the deck on the ground following the contour of the ground to provide an even cut. The maximum travel variable D could, of course be altered by modifying the structural parameters of the mower, shocks used, etc., all of which would still fall within the scope of the invention.

Figure 7:
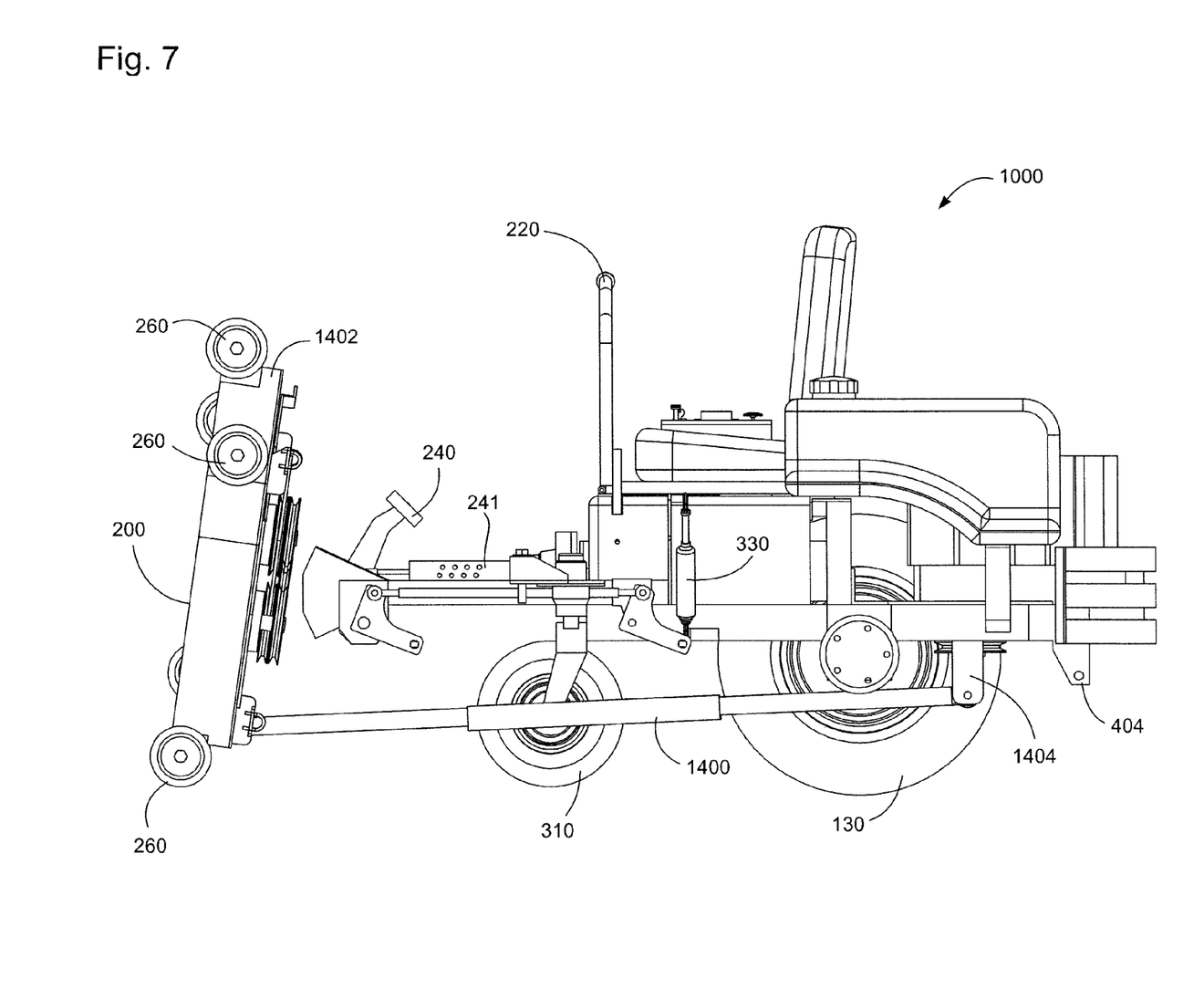
FIG. 7 shows a partial cutaway side view of a second embodiment of the invention in which the deck has been pulled out from under the mower and tilted up for maintenance.

FIG. 7 shows a second embodiment 1000 of the flexible mower with the front and rear wheels on the side closest to the viewer removed. This mower 1000 is the same except that the push arms 1400 have been adapted such that they are telescoping. As can be seen in FIG. 7 when the deck 1402 is pulled out from under the mower 1000 and tilted up to the maintenance position the push arms 1400 remain attached to the deck 1402 and to the mower 1000. This is accomplished by making the push arms 1400 telescoping, and in the disclosed embodiment, the push arms 1400 telescope to about 3 times their retracted length. One advantage of this arrangement is that the deck 1402 becomes self guiding when it is put back under the mower 1000. The telescoping push arms are attached to both the deck 1402 and the mower 1000 and so they naturally guide the deck back to the installed position.

FIG. 8 shows the second embodiment mower 1000 with the deck 1402 returned to the mowing position and the telescoping push arms 1400 fully retracted. The arm 1400 attaches to an attachment gusset 1404 on the rear frame portion of the mower 1000. Because the arms 1400 always remain attached to the gusset 1404, there is no need for any user disconnection or reconnection like that required between parts 402 and 1404 (FIG. 4) in the first embodiment.

Figure 11:
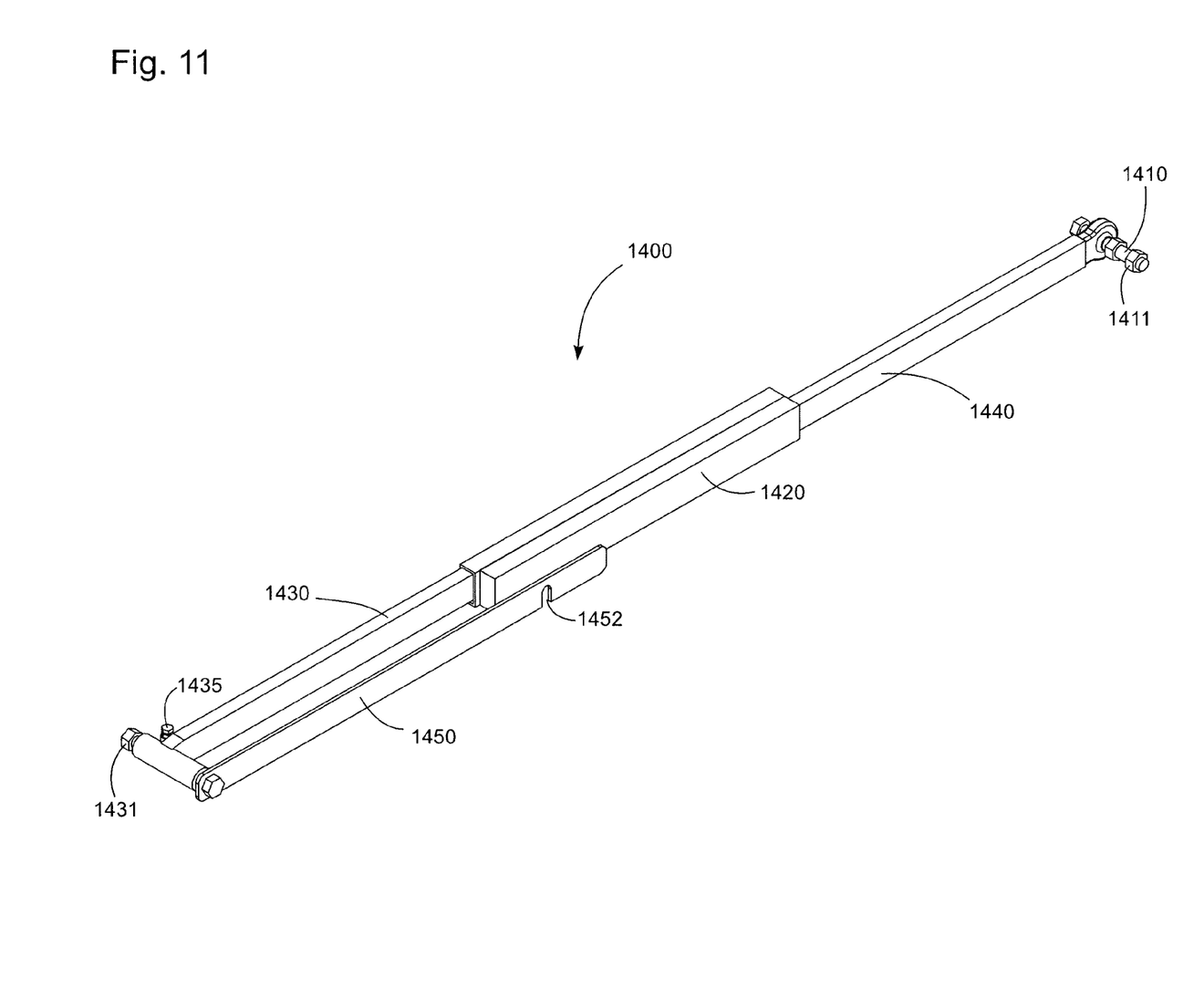
FIG. 11 shows details of one of the pair of telescoping push arms included in the second embodiment.

FIG. 11 shows details of the telescoping push arm 1400 of the second embodiment. Each push arm 1400 includes a bolt 1410 to attach the push arm 1400 to the gusset 1404 (FIG. 7). FIG. 11 shows the push arm 1400 fully extended. Dual channel 1420 houses two telescoping extensions 1430 and 1440. The extension 1430 includes a bolt 1431 to attach the extension 1430 to the deck 1402 (FIG. 7). The bolt 1431 also retains a push arm lock bar 1450 which includes a slot 1452. In the retracted position shown in FIG. 8 the lock bar slot 1452 fits over the bolt 1410 to hold the push arm 1400 in the retracted position. One skilled in the art will recognize that numerous other telescoping push arm arrangements could be used instead and still fall within the broad concepts disclosed herein.

In use, the second embodiment works in a fashion similar to the first in that the front wheels are initially in the closed position shown in FIG. 1, but are then spread apart in the position shown in FIGS. 2 and 3. Once in this position, the lock bar 1450 is raised to release the push arms enabling them to telescope out as the deck 1402 is pulled out from underneath the mower and then tilted up as shown in FIG. 7. After the deck 1402 is rotated up, the push arms 1400 hold the deck 1402 in the maintenance position shown in FIG. 7. The deck 1402 then resting against the push arms 1400 such that it is supported in the tilted maintenance position. A threaded adjustment 1435 (FIG. 11) is on the top forward end of push arms 1400 to control the amount of tilt of the deck 1402 in the maintenance position. FIG. 8 shows a safety catcher wheel 806 on gusset 1410 as seen in FIGS. 4 and 7.

It should be noted that it is possible in other embodiments the telescoping arms 1400 could be fixed at another location on the bottom of the mower, and that the deck could extended out another direction other than forward assuming it would clear the front and back wheels.

Those skilled in the art appreciate that variations from the specified embodiments disclosed above are contemplated herein. The description should not be restricted to the above embodiments, but should be measured by the following claims.

I claim:
1. A lawn mower comprising:
at least one engine, said at least one engine operable to drive one or more blades and a pair of rear wheels, said rear wheels depending from a rear frame of said mower;
a pair of front wheels depending from a front frame of said mower; said front frame including at least one surface for supporting the feet of a user during operation of said mower, said front frame also being pivotally mounted relative to said rear frame while said mower is traversing terrain such that a mower deck being at least partially supported underneath one of said front frame and rear frame more adequately maintains a cutting level above a ground surface during operation; and
said pivotally mounted front and rear frames rotate relative to one another in a plane which is substantially normal to a longitudinal axis of said mower and said frames are pivotally mounted using a pivot which is located between said front wheels and said rear wheels of said mower and also offset inwardly from each of said front and rear wheels.

2. The mower of claim 1 wherein said pivot is substantially centrally located between the front and rear wheels when said front wheels are in position for mowing.

3. The mower of claim 1 wherein said deck is made to be slidable out from underneath said front and rear frames using a deck accessing system.

4. The mower of claim 3 wherein said deck accessing system comprises:
a pair of swingable arms, each having a forward end for supporting each of said pair of front wheels, each of said swingable arms being lockable into a forward position wherein said front wheels are ready for operations, and said swingable arms being further adapted to be spread laterally in a substantially horizontal plane, while maintaining balance of the vehicle, into an outward position in which said wheels are moved out of the way so that said mower deck can be removed from underneath said one of said front and said rear frames.

5. The mower of claim 4 in which said swingable arms are each rotatably mounted about an arm pivot pin located and attached to a back portion of said front frame.

6. The mower of claim 5 wherein each of said swingable arms is made removably lockable in said forward position using a locking bolt which is received through a bore existing through each of said swingable arms threadingly and removably receivable into a portion of said front frame.

7. The mower of claim 3 wherein said deck accessing system utilizes a plurality of supporting devices which are all disconnectable from the undersides of one of the front and rear frames.

8. The mower of claim 7 wherein said supporting devices include:
a plurality of suspension members which have upper ends which are detachably secured to said front frame and said suspension members have lower ends which are attached at numerous positions about the upper surface of said deck, and a linking arm which is pivotally attached to a
rear portion of the deck surface, the other end of said linking arm being removably attachable to a bottom portion of the rear frame.

9. The mower of claim 8 wherein said linking arm is useable to support said deck after said deck has been rolled out from underneath said one of said front and rear frames for the purpose of exposing a blade in said blade deck for one of maintenance and replacement.

10. The mower of claim 3 wherein said deck accessing system includes a pair of telescoping arms, said arms each having forward ends which are secured at different lateral positions to a rear portion of said mower deck and second ends which are pivotally attached to one of the front and rear frames such that said mower deck is extendable out from underneath said mower for servicing, and then retractable back into place underneath said mower after servicing.

11. The mower of claim 10 wherein the forward ends of said telescoping arms are pivotally connected to the deck such that the deck is able to be raised up from a horizontal to a vertical position for servicing purposes.

12. The mower of claim 1 comprising:
a deck raising and lowering system, said system including a pedal mounted on said front frame, said pedal, when depressed by a user rotating a front control bar which extends laterally through and is rotatably secured in a front portion of said frame;
first and second forward adjustment arms fixed at each end of, and rotating with said control bar;
first and second lateral linking members having forward ends linked to a first outwardly extended portion on each of said first and second adjustment arms and rearward ends linked to first and second corresponding rearward adjustment arms; and
all of said forward and rearward adjustment arms having a detachable suspension mechanism which is suspended down from a second outwardly extending portion on each of said first and second adjustment arms to connect to an upper portion of said deck at different locations proximate to the periphery of said upper portion of said deck.

13. The mower of claim 12 in which at least some of said detachable suspension members are chains, each of said chains being optionally connectable onto a protruding pin member with a retaining head which protrudes from said outwardly extending portions of at least some of said first and second adjustment arms.

14. The mower of claim 3 comprising a pair of laterally disposed opposing shock absorber devices connected between said front and rear frames such that said shock absorber devices resist against the rotational motion of the front frame relative to the rear frame about said pivot and also bias said front and rear frames towards a neutral position.

15. The mower of claim 3 wherein said deck includes a plurality of gauge wheels disposed around the deck enabling said deck to be rolled out from under said mower.

16. The mower of claim 1 wherein the rear frame includes an axle and the front frame includes a hub and said axle and hub work together such that said front frame is pivotally mounted relative to said rear frame and shock absorbers connect said front frame to said rear frame and resist rotation of said front frame in a cross-sectional plain about said axle.

17. A riding self-propelled lawn mower comprising:
a front frame including front left and right wheels;
a rear frame carrying rear drive wheels;
a mower deck having at least one blade, said mowing deck supported underneath said front frame; said front frame including left
and right swing arms, said left swing arm carrying said left front wheel and said right swing arm carrying said right wheel; and said right and left swing arms being each positionable in a first state in which both right and left wheels are in front of the mower, and a second state where the right and left wheels arc outward to be beside the mower so that the deck is removable out from underneath the mower.

18. The mower of claim 17 wherein said swing arms arc outward in a plane that is substantially horizontal.

19. The mower of claim 17 wherein said deck is connected underneath said mower by two telescoping arms which enable the deck to be withdrawn from an operational position underneath the mower for servicing, and then retracted back underneath the mower to said operational position.

20. A lawn mower comprising:
at least one engine, said at least one engine operable to drive one or more blades, and a pair of rear wheels, said rear wheels depending from a rear frame of said mower;
a pair of front wheels depending from a front frame portion of said mower, said front wheels being lockable into a first forward position for operation and adapted to be arced outward to a second lateral position such that a deck can be removed for servicing a blade of said mower; and
a pair of telescoping arms secured between said rear frame and said mower deck such that said mower deck is extendable out from underneath said mower for servicing when said front wheels are in said second lateral position, and then retractable back into place underneath said mower after servicing.

21. A lawn mower comprising:
at least one engine, said at least one engine operable to drive one or more blades and a pair of rear wheels, said rear wheels depending from a rear frame of said mower;
a pair of front wheels depending from a front frame of said mower; said front frame being pivotally mounted relative to said rear frame using a pivot which is located between said front wheels and said rear wheels of said mower and also offset inwardly from each of said front and rear wheels such that a mower deck being at least partially supported underneath one of said front frame and rear frame more adequately maintains a cutting level above a ground surface during operation; and
at least one shock absorber device connected to dampen the rotation of the front frame relative to the rear frame against said pivot in response to bumps.

22. The lawn mower of claim 21 wherein at least one shock absorber device comprises a pair of laterally disposed opposing shock absorber devices connected such that said front and rear frames are tangentially biased towards a neutral position.

* * * * *